US012581389B2

(12) United States Patent
Tenny et al.

(10) Patent No.: US 12,581,389 B2
(45) Date of Patent: Mar. 17, 2026

(54) PACKET ROUTING IN A LAYER 2 MESH NETWORK

(71) Applicant: MediaTek Singapore Pte. Ltd., Singapore (SG)

(72) Inventors: Nathan Edward Tenny, San Jose, CA (US); Xuelong Wang, Beijing (CN); Guan-Yu Lin, Hsinchu City (TW); Chia-Hao Yu, Hsinchu City (TW); Ming-Yuan Cheng, Hsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 257 days.

(21) Appl. No.: 18/076,927

(22) Filed: Dec. 7, 2022

(65) Prior Publication Data

US 2023/0189117 A1     Jun. 15, 2023

Related U.S. Application Data

(63) Continuation of application No. PCT/CN2021/137394, filed on Dec. 13, 2021.

(30) Foreign Application Priority Data

Nov. 1, 2022    (CN) .......................... 202211357884.7

(51) Int. Cl.
*H04W 40/22* (2009.01)
*H04L 45/00* (2022.01)
*H04L 45/745* (2022.01)

(52) U.S. Cl.
CPC ............. *H04W 40/22* (2013.01); *H04L 45/20* (2013.01); *H04L 45/22* (2013.01); *H04L 45/745* (2013.01)

(58) Field of Classification Search
None
See application file for complete search history.

(56) References Cited

U.S. PATENT DOCUMENTS 7,433,691 B1 * 10/2008 White ................. H04W 40/248
                                                                   455/445
11,665,709 B1 * 5/2023 Pan ........................ H04W 72/25
                                                                   370/329
(Continued)

FOREIGN PATENT DOCUMENTS

CN        108366340 A     8/2018
CN        116264724 A  *  6/2023  ............ H04W 40/22
(Continued)

OTHER PUBLICATIONS

Taiwanese Office Action and Search Report issued Jan. 16, 2023 in Taiwanese Application 111144095, 7 pages.
(Continued)

*Primary Examiner* — Xavier S Wong
(74) *Attorney, Agent, or Firm* — Helen Mao; Imperium Patent Works

(57) ABSTRACT

This disclosure provides an apparatus operated as a relay node in a wireless mesh network for packet routing. The apparatus comprises processing circuitry that receives a packet including indications of a source node and a destination node. When the relay node is not the destination node, the processing circuitry determines whether the packet includes a path ID identifying a delivery route for the packet. When the packet includes the path ID and a routing table of the relay node includes a first next-hop node associated with the path ID, the processing circuitry transmits the packet to the first next-hop node. When the packet does not include the path ID or the routing table does not include the first next-hop node, the processing circuitry transmits the packet to one of a second next-hop node associated with the
(Continued)

destination node and a third next-hop node associated with an intermediate destination node.

20 Claims, 9 Drawing Sheets

(56)                    References Cited

U.S. PATENT DOCUMENTS

| | | | | |
|---|---|---|---|---|
| 2006/0114850 | A1* | 6/2006 | Avinash ................ | H04W 40/22 |
| | | | | 370/328 |
| 2007/0070983 | A1* | 3/2007 | Redi ................... | H04W 40/248 |
| | | | | 370/352 |
| 2015/0222393 | A1* | 8/2015 | Gacanin ............... | H04L 1/1854 |
| | | | | 714/748 |
| 2016/0212066 | A1* | 7/2016 | Ravindran ............. | H04L 45/38 |
| 2019/0356573 | A1 | 11/2019 | Chirikov | |
| 2022/0286938 | A1* | 9/2022 | Wang ................... | H04W 76/19 |
| 2023/0403067 | A1* | 12/2023 | Visa ........................ | H04L 45/24 |
| 2024/0056940 | A1* | 2/2024 | Lagrange ............. | H04W 40/22 |

FOREIGN PATENT DOCUMENTS

| | | | |
|---|---|---|---|
| WO | WO 2021/027949 | A1 | 2/2021 |
| WO | 2021168632 | | 9/2021 |

OTHER PUBLICATIONS

China Intellectual Property Office Action 202211357884.7 Dated Aug. 2, 2025.

* cited by examiner

410

Routing table at UE 403:

| Destination | Next hop |
|-------------|----------|
| 405 | 405 |
| 404 | 404 |
| 401 | 401 |
| 406 | 405 |
| 406 | 404 |
| 402 | 404 |
| 402 | 401 |

700

Wider mesh

780

760

| Destination | Next hop |
|---|---|
| 730 | 730 |
| 720 | 720 |
| 710 | 730 |
| 780 | (other node) |

702

740

730

720

710

| Destination | Next hop |
|---|---|
| 730 | 730 |
| 720 | 730 |
| 740 | 730 |
| 740 is a gateway node | |

701

PACKET ROUTING IN A LAYER 2 MESH NETWORK

INCORPORATION BY REFERENCE

This present disclosure claims the benefit of China Application No. 202211357884.7, filed on Nov. 1, 2022, which claims the benefit of International Application No. PCT/CN2021/137394, filed on Dec. 13, 2021. The entire disclosures of the prior applications are hereby incorporated by reference in their entirety.

TECHNICAL FIELD

The present disclosure relates to wireless communications, and specifically relates to a procedure for routing data packets in a wireless mesh network that relies on relaying functionality in layer 2 of a protocol stack.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a wireless network, static network nodes can offer coverage to all devices in this network. The 3rd Generation Partnership Project (3GPP) Release 17 (Rel-17) introduces sidelink UE-to-network relaying, in which certain "relay" User Equipment (UE) extends network coverage to other "remote" UEs using a sidelink interface (e.g., PC5). Relaying is supported by using both layer 2 and layer 3 architectures with a limitation to a single hop as specified in the standard. Cellular systems may introduce mesh network in which peer devices can communicate among themselves and multiple hops and paths are supported. The more flexible topology of mesh networks requires a more complex routing approach.

SUMMARY

Aspects of the disclosure provide a method of packet routing operable in a relay node of a wireless mesh network. Under the method, a packet is received at a first protocol layer of the relay node from a previous-hop node. The packet includes indications of a source node and a destination node of the packet. When the relay node is not the destination node, it is determined whether the packet includes a path ID identifying a delivery route for the packet. When the packet includes the path ID and a routing table of the relay node includes a first next-hop node associated with the path ID, the packet is transmitted from the relay node to the first next-hop node. When the packet does not include the path ID or the routing table of the relay node does not include the first next-hop node associated with the path ID, the packet is transmitted from the relay node to one of a second next-hop node associated with the destination node and a third next-hop node associated with an intermediate destination node in the routing table of the relay node.

In an embodiment, the packet includes a packet body of the packet.

In an embodiment, it is determined whether the packet includes an indication of the intermediate destination node.

When the packet includes the indication of the intermediate destination node and the routing table of the relay node includes the third next-hop node associated with the intermediate destination node, the packet is transmitted from the relay node to the third next-hop node associated with the intermediate destination node in the routing table of the relay node. When the packet does not include the indication of the intermediate destination node or the routing table of the relay node does not include the third next-hop node associated with the intermediate destination node, it is determined whether the routing table of the relay node includes the second next-hop node associated with the destination node. When the routing table of the relay node includes the second next-hop node associated with the destination node, the packet is transmitted from the relay node to the second next-hop node associated with the destination node in the routing table of the relay node.

In an embodiment, when the relay node is the destination node, the packet is processed at a second layer of the relay node, and an acknowledgement indication is sent to the source node of the packet.

In an embodiment, the acknowledgement indication is carried by a control protocol data unit (PDU) of a sidelink relay adaptation protocol routing (SRAP) protocol layer of the relay node.

In an embodiment, it is determined whether a termination condition for delivery of the packet is met.

In an embodiment, the termination condition includes a failure to determine a next-hop node from the routing table.

In an embodiment, the termination condition includes determining that a hop count for delivery of the packet has exceeded a maximum hop count.

In an embodiment, the termination condition includes determining that a time-to-live (TTL) associated with the packet has exceeded a maximum TTL.

In an embodiment, the termination condition includes determining that the packet has been previously handled at the relay node.

In an embodiment, when the termination condition is met, at least one of the following steps is performed: (i) the packet is discarded; (ii) a failure indication is sent from the relay node to at least one of the source node or the previous-hop node; (iii) the packet is sent to the previous-hop node; (iv) a route to the destination is requested from another node of the mesh network; and (v) the packet is forwarded to a candidate next-hop node that determines a route to the destination.

In an embodiment, the failure indication is carried by a control PDU of a routing protocol.

In an embodiment, the failure indication includes a copy of the packet.

In an embodiment, the candidate next-hop node is a gateway node having connectivity to a cellular network.

In an embodiment, the connectivity to the cellular network is provided by a radio interface between the gateway node and a base station of the cellular network.

In an embodiment, the second next-hop node associated with the destination node in the routing table has a minimum hop count to the destination node among a plurality of candidate next-hop nodes associated with the destination node in the routing table.

In an embodiment, the second next-hop node associated with the destination node in the routing table has a maximum anticipated link quality to the destination node among a plurality of candidate next-hop nodes associated with the destination node in the routing table.

In an embodiment, the anticipated link quality is a function of measured radio link qualities of a plurality of intermediate nodes, and each of the plurality of intermediate nodes corresponds to a respective path to the destination node.

In an embodiment, the relay node is one of a user equipment and a base station of a cellular network.

Aspects of the disclosure provide an apparatus operated as a relay node in a wireless mesh network for packet routing. The apparatus includes processing circuitry that receives a packet from a previous-hop node. The packet includes at least indications of a source node and a destination node of the packet. When the relay node is not the destination node, the processing circuitry determines whether the packet includes a path ID identifying a delivery route for the packet. When the packet includes the path ID and a routing table of the relay node includes a first next-hop node associated with the path ID, the processing circuitry transmits the packet from the relay node to the first next-hop node. When the packet does not include the path ID or the routing table of the relay node does not include the first next-hop node associated with the path ID, the processing circuitry transmits the packet from the relay node to one of a second next-hop node associated with the destination node and a third next-hop node associated with an intermediate destination node in the routing table of the relay node.

Aspects of the disclosure provide a non-transitory computer-readable storage medium storing a program implementing any one or a combination of methods for packet routing operable in a relay node of a wireless mesh network.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

In a mesh network of mobile devices, a well-defined routing behavior is desirable to deliver packets from source nodes to destination nodes in the mesh network. The routing functionality can deliver packets efficiently according to the current conditions of the mesh, which may be subject to dynamic change, and can be resistant to delivery failures due to topology changes and due to loops, that interfere with packet delivery.

In an embodiment, a mesh network comprises a set of nodes, any of which may potentially be mobile or stationary. The set of nodes can perform communication using device-to-device links in such a way that a first node of the mesh can deliver communication data (for instance, a data packet) to a second node of the mesh network, even though the first node and the second node may not be in direct radio contact with one another. The communication data may be forwarded by one or more additional nodes of the mesh network operating as relays between the first node and the second node. An example may be a set of devices operating according to 3GPP specifications, comprising a mix of User Equipments (UEs) and base stations (such as eNBs, gNBs, base stations of any other wireless technologies, and the like), and communicating through radio interfaces (for example, a sidelink or PC5 interface between pairs of UEs, a Uu interface between a UE and a base station, and so on). A packet may be generated by a first node, addressed to a second node, and delivered according to a routing protocol from the first node to the second node via one or more intervening relay nodes.

Figure 1:
FIG. 1 shows an example of delivering a packet in a mesh network including user equipments (UEs) according to embodiments of the disclosure.

FIG. 1 shows an exemplary delivery of a packet in a mesh network 100 consisting of UEs according to embodiments of the disclosure. In an embodiment of FIG. 1, all the mesh nodes are UEs, communicating with one another via a device-to-device interface (for example, a sidelink or PC5 interface). The mesh network 100 includes a collection of UEs 110-160 and a packet is delivered from UE 110 to UE 160. UE 110 generates a packet for transmission to UE 160, but there is no direct radio link between UE 110 and UE 160. In the absence of such a direct link, the packet can be delivered from UE 110 to UE 160 through multiple relay UEs. For example, UE 110 can transmit the packet to UE 120 (with which UE 110 has a direct link 171), which can transmit the packet to UE 140 (with which UE 120 has a direct link 172), which can transmit the packet to UE 160 (with which UE 140 has a direct link 173). Upon reception of the packet, UE 160 recognizes that it is the addressee of the communication (for instance, based on a destination identity in a header of the communication) and processes the packet.

In an embodiment, a mesh network may include network nodes in addition to UEs. The network nodes may be viewed as termination points that can deliver packets to and from a core network (CN), and/or the network nodes may be in direct communication with one another.

Figure 2:
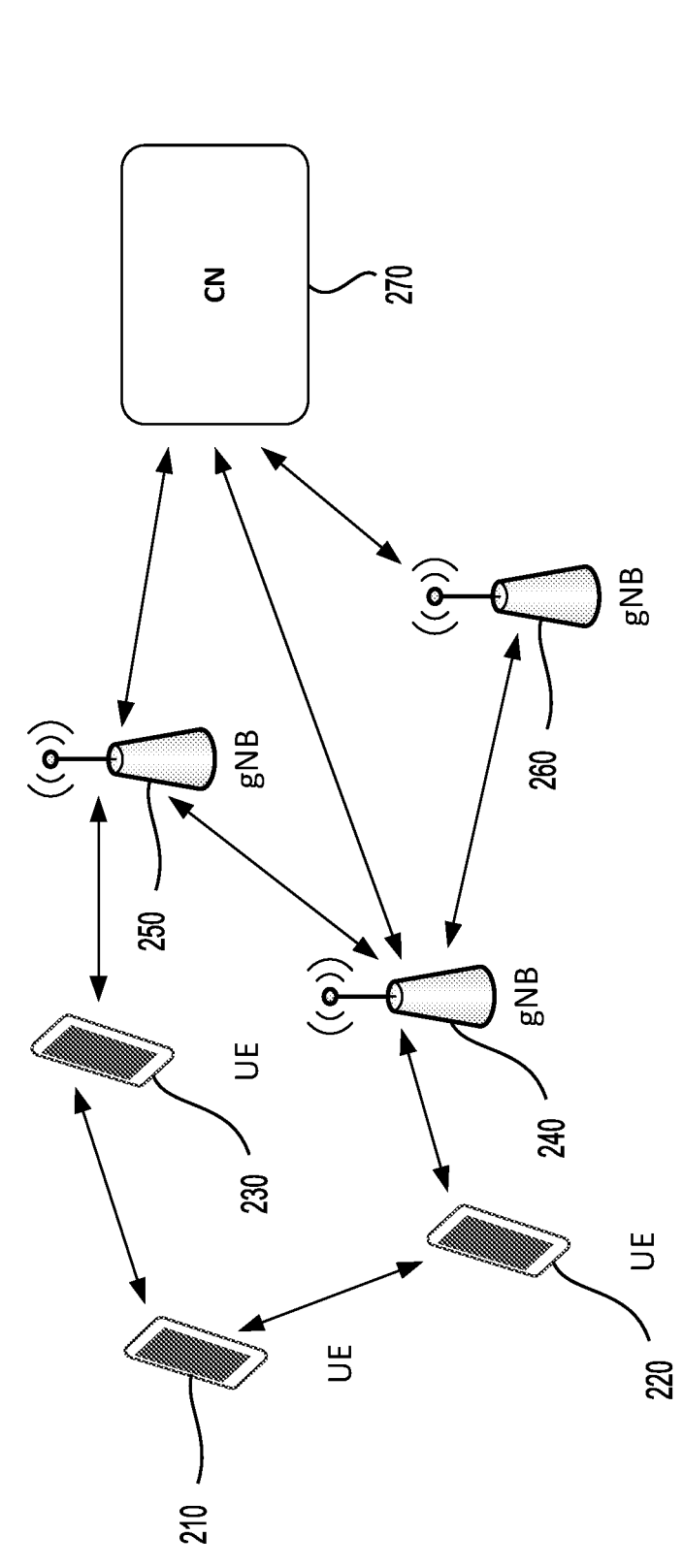
FIG. 2 shows an example of a mesh network including UEs and gNodeBs (gNBs) connected to a core network (CN) according to embodiments of the disclosure.

FIG. 2 shows an exemplary mesh network 200 consisting of UEs 210-230 and gNBs 240-260 connected to a CN 270 according to embodiments of the disclosure. In the example of FIG. 2, there are at least two types of radio links. The first type is UE-to-UE links (e.g., between UE 210 and UE 230), which may use a device-to-device interface such as PC5. The second type is UE-to-gNB links (e.g., between UE 230 and gNB 250), which may use a Uu interface (i.e., a radio interface between a base station and a UE).

In an embodiment, the gNB-to-gNB links (e.g., between gNB 250 and gNB 240) may rely on wireless transport over a radio link, which may, for instance, rely on a device-to-device interface such as PC5. In an embodiment, the gNB-to-gNB links may use wired transport or a combination of wired and wireless transport. Similarly, the backhaul links from gNBs 240-260 to the CN 270 may be wired or wireless. A packet may traverse any combination of these wired and/or wireless links in transit from a source of the packet to a destination of the packet. For example, a packet generated at UE 210 for transmission to the CN 270 may go from UE 210 to UE 230 to gNB 250 to the CN 270; a packet generated at UE 220 for transmission to UE 210 may go directly from UE 220 to UE 210; a packet generated at UE 220 for transmission to UE 230 may go from UE 220 to UE 210 to UE 230, or from UE 220 to gNB 240 to gNB 250 to UE 230.

According to aspects of the disclosure, a packet in the mesh network may have multiple routes to a destination of the packet. A routing protocol plays the role of selecting an appropriate route for a packet and may be utilized at any of the mesh nodes such as a UE or a base station. The routing protocol may consider many different factors in selecting a route for a packet, such as the quality of individual links between nodes in the mesh network, the size of the packet, the length of the route (e.g., in number of hops), the quality-of-service (QoS) requirements of the packet, etc.

Figure 3:
FIG. 3 shows an example of a protocol stack for a layer 2 mesh network according to embodiments of the disclosure.
Figure 3:
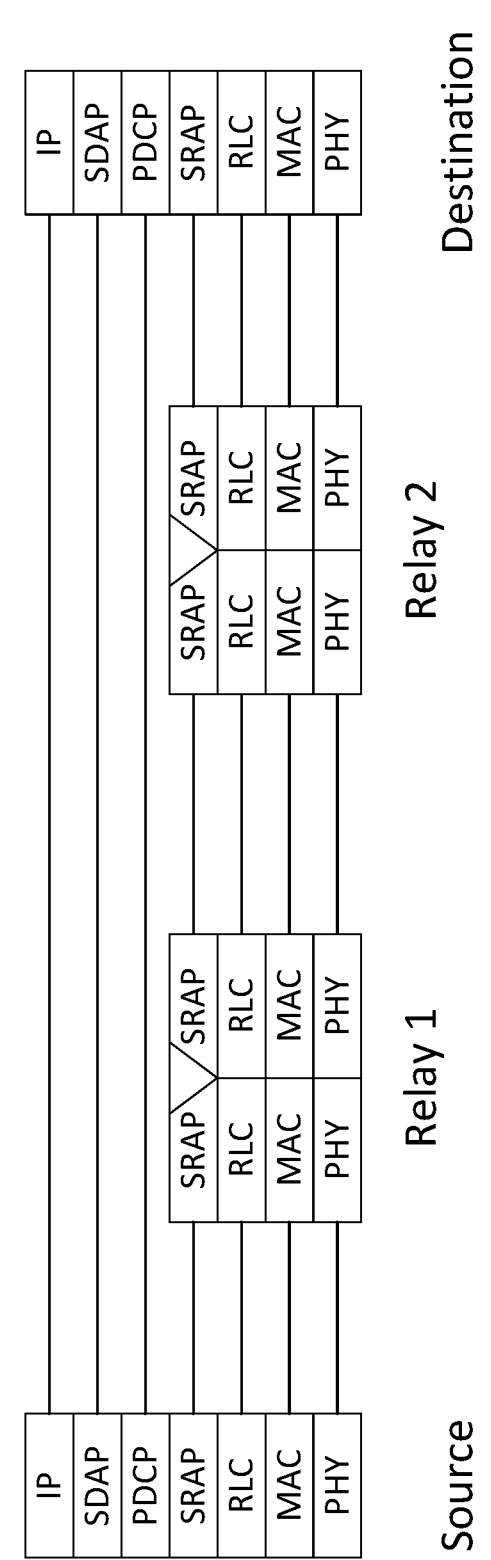

FIG. 3 shows exemplary protocol stacks 300 for a layer 2 mesh network, in the context of communication from a source node to a destination node via two relay nodes, according to embodiments of the disclosure. A mesh network may be realized with different protocol stacks, depending on the functionality of the devices involved and the architectural assumptions of the network design. The protocol stacks 300 of FIG. 3 can contain the following layers:

Internet protocol (IP) layer, responsible for carrying packets between the endpoints and delivering them to and from upper layers;

Service data application protocol (SDAP) layer, responsible for QoS flow management;

Packet data convergence protocol (PDCP) layer, responsible for a variety of functions at the packet level, such as in-order delivery, security, etc.;

Sidelink relay adaptation protocol (SRAP) layer, responsible for mediating between the upper layers (terminated end-to-end between the source and destination) and the lower layers (terminated hop-by-hop between consecutive nodes in the data path), source and destination identification, bearer mapping, and routing;

Radio link control (RLC) layer, responsible for reliable delivery on each hop of the data path;

Medium access control (MAC) layer, responsible for establishing and maintaining a mapping relationship between logical channels and transport channels; and Physical (PHY) layer, responsible for the transfer of symbol-level data on each hop of the data path.

It is noted that other protocol stacks can be included in the protocol stacks 300 of FIG. 3, which are modelled on the layer 2 relaying functionality specified in 3GPP Rel-17, and the protocol names and functions reflect the design of this relaying functionality. A protocol layering same as or similar to FIG. 3 can be assumed in the rest of this disclosure, but it should be appreciated that the described concepts can be applied to any other protocol stacks embodying similar relaying functionality.

It should be noted that in some mesh networks, every node may be capable of functioning as a relay, while in other mesh networks, only certain nodes may be capable of functioning as relays. In the latter case, nodes that cannot function as relays may have restricted functionality of the routing layer (for example, the SRAP layer in the protocol stacks 300 of FIG. 3). For example, the SRAP entity in a non-relay node may be capable of addressing a generated packet from the non-relay node and determining a next hop to handle the generated packet, but the SRAP entity in the non-relay node may not be capable of evaluating a received packet to determine a next hop to handle the received packet. Rather, the SRAP entity may expect that any packet received by the non-relay node is destined for the non-relay node itself. The SRAP entity may, for example, discard any packet received at the non-relay node with an address in the header that does not match the non-relay node.

In order to deliver a packet in the mesh network, each node that handles the packet can have a method for determining where to send the packet next, i.e., a routing protocol. There are multiple ways to approach routing. In one example, the mesh network may be assumed to be static or nearly static, and routes can be pre-defined and distributed to all nodes. This approach is similar to the use of path IDs in the integrated access and backhaul (IAB) feature in 3GPP new radio (NR), in which a path ID corresponds to a sequence of nodes and each packet is delivered to the next node along the path specified by the sequence of nodes. In another example, the mesh network may be able to change dynamically, meaning that there is no one node that necessarily knows the topology of the whole mesh network at a given moment. In such an example, source routing such as the use of a path ID is inefficient or impractical, and each node may need to make a substantive decision to identify the next hop on a packet's route.

This disclosure includes embodiments that allow the hybrid use of path IDs and dynamic route generation.

In an embodiment, the source node that generates a packet can populate the SRAP header with at least a destination, and optionally a path ID. The source node may also indicate its own identity as the source of the transmission (alternatively, the source can be populated in the SRAP header by the first relay node that handles the packet). The path ID may be included, for example, if the source node has been informed of a reliable static route to the destination. The source node then determines at least one first hop for the packet, which may be determined in various ways.

As one example, if the source node is connected to only one other node, the source node may deliver the packet to the one other node for routing.

As another example, if the source node has a routing table that provides one or more next hops associated with the destination, the source node may determine the at least one first hop based on looking up the destination in the routing table.

As a third example, the source node may provide an intermediate destination and a final destination, so that subsequent relay nodes can first route the packet to the intermediate destination, and the intermediate destination can then be responsible for routing the packet to the final destination. The intermediate destination may be a distinguished relay node, e.g., a relay node with enhanced routing capabilities or broad connectivity. (The third example may be useful in a so-called "cluster-head" topology, where certain distinguished nodes consider themselves as reliable routes to a "cluster" of other nodes.)

These examples will be further explored below.

Figure 4:
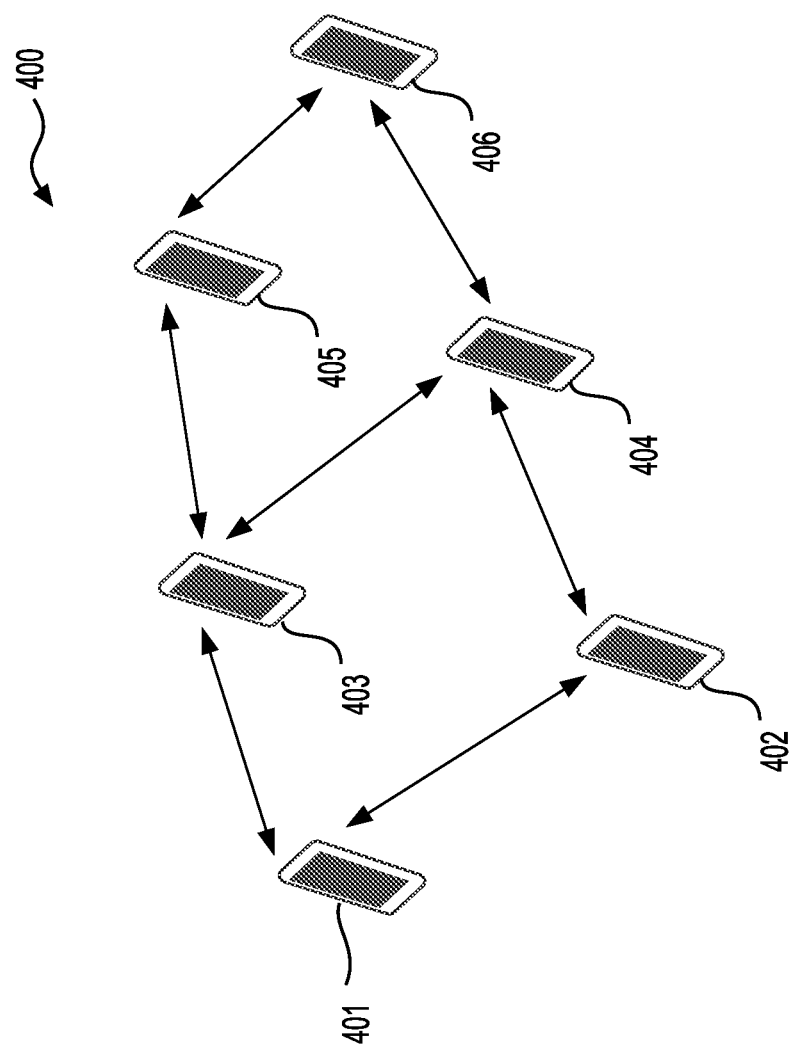
FIG. 4 shows an example of a mesh network including UEs and a routing table for one of the UEs according to embodiments of the disclosure.

FIG. 4 shows an exemplary mesh network 400 consisting of UEs 401-406 and a routing table 410 for UE 403 according to embodiments of the disclosure. The routing table 410 presents the succeeding (next-hop) nodes that can be chosen by UE 403 for different destination nodes. For any destination node, the routing table 410 may contain no entry (indicating that this node is unreachable) or multiple entries (e.g., for UE 406, there are two entries for UE 405 and UE 404). In the latter case, UE 403 needs to make a decision based on certain criterion(s).

Destination-based routing such as the use of the routing table 410 is vulnerable to loops. For example, if UE 403 determines a first route to UE 406 goes through UE 405, but UE 405 determines a second route to UE 406 goes through UE 403, packets can ping-pong between UE 403 and UE 405 forever. Larger networks lead to more complex loops. Accordingly, loop avoidance is a challenging topic in destination-based routing algorithms.

Figure 5:
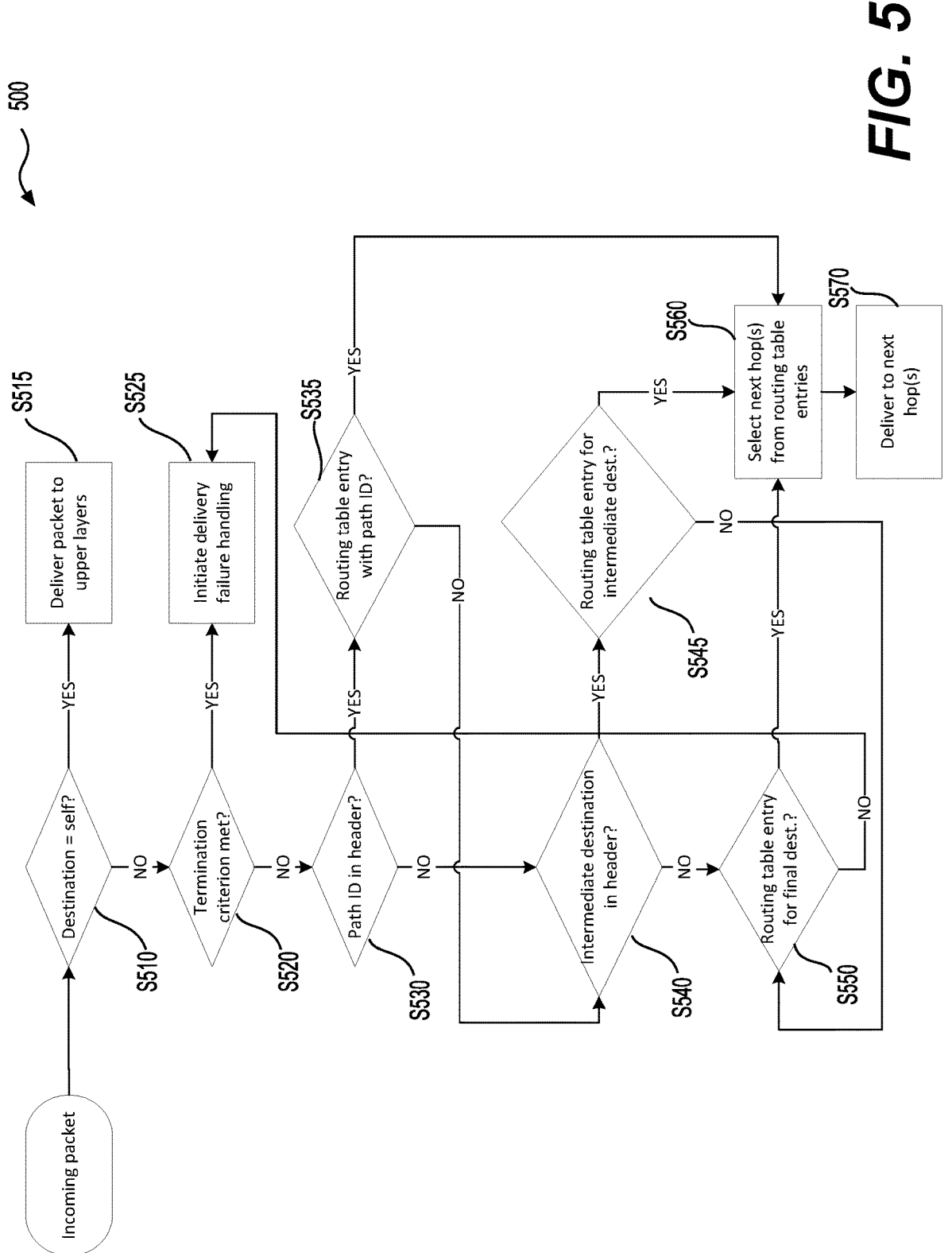
FIG. 5 shows an example of a flowchart outlining a process for delivery of a packet at a relay node according to embodiments of the disclosure.

FIG. 5 shows an exemplary flowchart outlining a process 500 for delivery of a packet at a relay node according to embodiments of the disclosure. In various embodiments, the relay node can be a UE (e.g., the UE in FIG. 1) or a base station (e.g., the gNB in FIG. 2). The process 500 can be executed by processing circuitry of the relay node. The process 500 can also be implemented in software instructions, thus when the processing circuitry executes the software instructions, the processing circuitry can perform the process 500. The process 500 may start from step S510.

Step S510: The process 500 receives an incoming packet and determines if a destination of the incoming packet is an identity of the relay node. If the destination of the packet (e.g., as indicated by a destination field in the SRAP header) is the identity of the relay node, the process 500 proceeds to step S515. Otherwise, the process proceeds to step S520.

Step S515: The process 500 delivers the packet to upper layers (e.g., to a PDCP sublayer) and then terminates.

Step S520: The process 500 determines if a termination criterion is met. If the termination criterion is met, the process 500 proceeds to step S525. Otherwise, the process 500 proceeds to step S530.

Step S525: The process 500 initiates delivery failure handling and then terminates.

Step S530: The process 500 determines if the SRAP header includes a path ID. If the SRAP header includes the path ID, the process 500 proceeds to step S535. Otherwise, the process 500 proceeds to step S540.

Step S535: The process 500 consults a routing table of the relay node for a next hop associated with the path ID. If such a next hop is found, the process 500 proceeds to step S560. Otherwise, the process proceeds to step S540.

Step S540: The process 500 determines if the SRAP header includes an intermediate destination. If the SRAP header includes the intermediate destination, the process 500 proceeds to step S545. Otherwise, the process 500 proceeds to step S550.

Step S545: The process 500 consults the routing table of the relay node for a next hop associated with the intermediate destination. If such a next hop is found, the process 500 proceeds to step S560. Otherwise, the process proceeds to step S550.

Step S550: The process 500 consults the routing table of the relay node for a next hop associated with the final destination. If such a next hop is found, the process 500 proceeds to step S560. Otherwise, the process 500 proceeds to step S525. If exactly one next hop is found, deliver the packet to the next hop and terminate processing. (The path ID, if present, may also be removed from the header in this step, since this step occurs only if the relay node was unable to route the packet according to the path ID.)

Step S560: The process 500 selects one or more next hop(s) from the routing table entries. If more than one next hop (i.e., a set of next hop candidates is available) is found in step S535 or step S545 or step S550, the process 500 selects, from the available set of next hop candidates, one or more next hops based on a set of hop selection criteria. Then, the process 500 proceeds to step S570.

Step S570: The process 500 delivers the packet to the selected next hop(s), and then terminates.

In an embodiment, the delivery failure handling at step S525 may include multiple steps, separately or in combination. For example, the relay node may discard the problematic packet, send a delivery failure notification to the node from which the relay node received the packet, send a delivery failure notification to the source of the packet, return the packet to the node from which the relay node received the packet (back-propagation), proactively request a route to the destination from other nodes, forward the packet to a candidate next hop node that may be able to determine a route to the destination, and so on.

In an embodiment, the termination criterion mentioned in step 520 may include one or more of the following criteria. For instance, the packet may include a maximum hop count or "time to live" (TTL), which when exceeded causes the relay node to consider the packet as undeliverable. As another example, the packet may be identified as having been previously handled at the same relay node, i.e., the packet is experiencing a routing loop. (A packet previously handled at the same relay node may be processed differently if it is being delivered for back-propagation as described above, however. For instance, if node X delivers a packet to node Y that is ultimately destined for node Z, and node Y then returns the packet as undeliverable, node X may look for an alternative route to node Z and retransmit the packet on the alternative route.) As a third example, the packet may have QoS criteria that cannot be met, such as a packet delay budget that the relay node cannot comply with.

In an embodiment, when multiple next hops are available to a given destination, the hop selection criteria for selecting one or more of the multiple next hops may take various forms. As one example, the selection criteria may be dependent on the implementation of the relay node without other complementary information such as a minimum anticipated hop count, on the assumption that any next hop that appears in the routing table will be valid. As another example, the relay node may select one or more next hops with a minimum anticipated hop count to the destination (assuming that a hop count is advertised as part of the maintenance of the routing tables). It should be noted that this criterion may imply that if the destination itself is found as a next hop, a direct link to the destination will always be used. This may not be an ideal outcome. For example, if A→C is a low-quality link, but A→B and B→C are high-quality links, and then the route A→B→C may be preferable to A→C. As a third example, the relay node may derive an aggregate link quality metric to the destination (the mechanics of such a derivation will be discussed further below). These criteria may also be combined; for example, the relay node can select the next hop offering the maximum link quality among all paths with a number of hops that is less than a critical number of hops.

In an embodiment, the derivation of link quality, which may be used as a criterion for selecting one or more next hops, may depend on the information that is available in the mesh network. For instance, when nodes advertise routing information, they may advertise link quality information, such as a metric Q(X, Y) that represents the anticipated quality of the path from X to Y. For cases where X and Y have a direct radio link, $Q_{direct}(XY)$ may be defined to be a function of the radio link, such as a value based on a measured reference signal received power (RSRP), a value based on a measured reference signal received quality (RSRQ), or any other measure of the quality of the radio link. Then, a recursive definition can be used, in which a relay node A considers the quality Q(A,B) of its path to a destination node B to be the maximum of all advertised path qualities from other nodes; for example, $$Q(A, B) = \max_X \left( \frac{Q(A, X) + Q(X, B)}{2}, Q_{direct}(A, B) \right)$$

In the above equation, the quality of each path is the average of the direct link qualities along the path, and thus the quality that can be offered as a route from A to B is the maximum of such path qualities).

The options for delivery failure handling as described above may include certain tradeoffs. The simplest approach is for the relay node to simply drop an undeliverable packet, assuming that upper layers can handle any needed retransmission, and/or that other paths to the destination can be able to deliver the packet. However, if no path to the destination is available, waiting for an upper-layer timeout to trigger retransmission may delay the ultimate delivery of the packet, and more sophisticated failure handling may provide a more efficient delivery process.

In an embodiment, the relay node can send a simple delivery failure indication to the "upstream" node, i.e., the node from which the relay node received the packet. The delivery failure indication may be carried by a control protocol data unit (PDU) of the SRAP layer. This indication informs the upstream node that the packet may need to be redelivered, allowing the upstream node to attempt delivery through a different route to the destination. For this mechanism to work, the upstream node can retain the packet after transmitting the packet to the relay node. However, the upstream node may not know when or if the packet is finally delivered to its destination. In the example protocol stack shown in FIG. 3, reliable delivery can be ensured by the RLC layer on a hop-by-hop basis; that is, the upstream node knows that the packet is successfully delivered to the relay node, but the upstream node is not informed when the relay node successfully delivers the packet onward. One solution can be for a protocol layer (for example, the SRAP layer) to propagate acknowledgements back from the final destination to the sending nodes, so that each node in the path can be informed of the successful delivery, allowing the sending nodes to delete any stored copy of the concerned packet. However, this approach increases traffic in the mesh network due to the potential flood of acknowledgements and requires that the destination node knows all the nodes in the path that the packet took, which may involve, for example, storing more information in the SRAP header during the transmission process.

Figure 6:
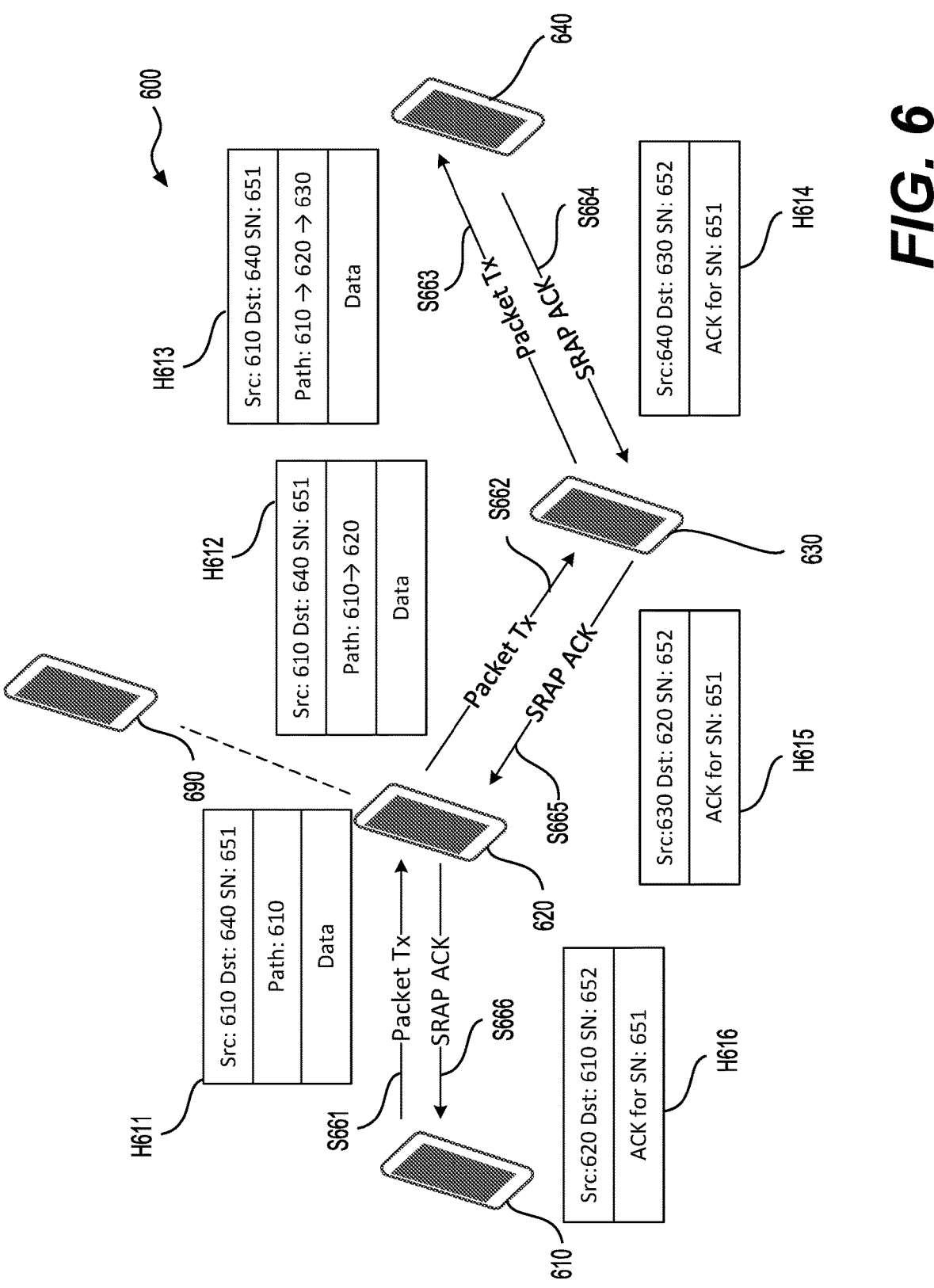
FIG. 6 shows an example of a reliable delivery mechanism using sidelink relay adaptation protocol (SRAP) acknowledgement signals (ACKs) according to embodiments of the disclosure.

FIG. 6 shows an exemplary reliable delivery mechanism 600 using SRAP acknowledgement signals (ACKs) according to embodiments of the disclosure. In the mechanism 600, a packet is transmitted from node 610 to node 640. The transmission of the packet may start from step S661.

In step S661, node 610 transmits a packet to node 620 for delivery to node 640. A header H611 of the packet indicates the source (610), the destination (640), and a sequence number (SN) (651). The header H611 of the packet may further indicate the path taken by the packet in its travels through the mesh network. At this step the path includes only node 610. Node 610 retains the packet in case node 610 needs to retransmit the packet later. Node 620 receives the packet and applies a first forwarding procedure, according to the procedure described in FIG. 5, to determine a next hop. According to the first forwarding procedure, node 620 determines that the next hop is node 630.

In step S662, node 620 forwards the packet to node 630 for delivery to node 640. The header H612 of the packet indicates the source (610), the destination (640), and the SN (651). The header H612 of the packet may further indicate the path taken by the packet. At this step the path includes nodes 610 and 620 and is indicated as 610→620 in the header H612. Node 620 retains the packet in case node 620 needs to retransmit the packet later. Node 630 receives the packet and applies a second forwarding procedure (which may or may not be identical to the first forwarding procedure used by node 620 in the previous step) to determine a next hop. According to the second forwarding procedure, node 630 determines that the next hop is node 640.

In step S663, node 630 forwards the packet to node 640, completing the delivery process. The header H613 of the packet indicates the source (610), the destination (640), and the SN (651). The header H613 of the packet may further indicate the path taken by the packet. At this step the path includes nodes 610, 620, and 630, and is indicated as 610→620→630 in the header H613. Node 640 receives the packet, recognizes that it is the final destination of the packet, and delivers the packet to upper layers for processing. Note that node 630 may not need to retain the packet for future retransmission, because lower layers (e.g., an RLC layer) may indicate to node 630 that the packet was successfully delivered to node 640, which is the final destination of the packet.

According to aspects of the disclosure, an ACK procedure is performed when the packet has been successfully received by node 640.

In an embodiment, the ACK procedure can propagate an SRAP ACK hop-by-hop through the mesh network, such that each node propagates an ACK to its predecessor node in the path, as shown in step S664-S666.

In step S664, node 640 sends an SRAP ACK to node 630. The SRAP ACK may be carried by a control PDU of the SRAP layer. The header H614 of the ACK indicates the source (640), the destination (630), and optionally an SN (652). The ACK further indicates that this ACK is for the packet with SN 651 (this indication may be considered as part of the header of the ACK or as the body of the ACK). Node 630 receives the ACK, confirming that the packet has been successfully received by node 640. If node 630 retained the packet at the end of step S663, node 630 may delete the stored packet.

It is noted that step S664 in FIG. 6 may not be necessary, because node 630 may already be aware of the successful delivery of the packet to node 640. As a result, step S664 may be omitted, and the subsequent step S665 may be triggered based on node 630 detecting successful delivery of the packet to node 640 (for example, reception of an RLC ACK for the packet). However, this may include a layering violation, in which a function of the SRAP layer is triggered based on an event in the RLC layer.

In step S665, node 630 sends an SRAP ACK to node 620. The header H615 of the ACK indicates the source (630), the destination (620), and an SN. (In this example, the SN of the ACK in step S665 is shown as being the same as the SN in step S664; alternatively, the SN on the link between 620 and 630 may be assigned independently of the SN on the link between 630 and 640, potentially resulting in different SNs for the ACKs in the different steps.) Node 620 receives the ACK, confirming that the packet has been successfully received by node 640. (Although the source of the ACK is node 630, the semantics of the ACK indicate that the packet was delivered to its final destination, in this case node 640.) Node 620 may delete the stored packet.

In step S666, node 620 sends an SRAP ACK to node 610. The header H616 of the ACK indicates the source (620), the destination (610), and an SN (which, similar to the previous step, may be the same as or different from the SNs of previous SRAP ACKs in the ACK procedure). Node 610 receives the ACK, confirming that the packet has been successfully received by node 640. Node 610 may delete the stored packet. Since node 610 was the original source of the packet, no further ACKs are necessary, and the ACK procedure is completed.

It is noted that the ACK procedure of FIG. 6 does not depend on the contents of the path shown in the packet header in steps S661-S663. However, it requires that each relay node, when the respective relay node stores the packet for potential future retransmission, needs to also store information on which node the respective relay node received the packet from.

In an embodiment, as a first alternative approach to the ACK procedure shown in FIG. 6, node 640 may separately send SRAP ACKs to all nodes in the path. For example, node 640 may consult the path from the header of the packet node 640 receives in step S663, and learn that nodes 610, 620, and 630 all transmitted copies of this packet. Accordingly, node 640 may send SRAP ACKs separately to nodes 610, 620, and 630. In this case, each SRAP ACK may indicate node 640 as its source, and a different node (respectively 610, 620, or 630) as its destination, while also indicating an acknowledgement for the packet with SN 651. The SRAP ACK for node 630 may be delivered directly from node 640 to node 630. The SRAP ACK for node 620 may be forwarded by node 630. The SRAP ACK for node 610 may be forwarded by nodes 630 and 620. Alternatively, each SRAP ACK may take a different route through the mesh network, according to, for example, the most expedient routing at the moment the ACK is transmitted. Accordingly, the path of the ACK may not be the same as the reversed path of the original packet.

It is noted that the ACK procedure of FIG. 6 assumes an SRAP-packet-based SRAP acknowledgement mechanism. In some cases, multiple-SRAP-packet-based SRAP acknowledgement can be performed. In this case, the ACK message header (for example, an SRAP header of the SRAP control PDU carrying the ACK) or the ACK message body includes a plurality of SNs for a plurality of packets received by the destination. In this case, the source and the intermediate nodes along the transmission route from source to destination need to retain the plurality of SRAP packets before receiving such an SRAP ACK.

The first alternative approach described above (i.e., node 640 separately sends SRAP ACKs to all nodes in the path) is clearly less efficient in a static mesh than hop-by-hop acknowledgement, since the first alternative approach results in a separate transmission through the mesh network for each node in the path. The first alternative approach also requires the additional information of the path in the packet header in steps S661-S663. However, one benefit is that this alternative approach is robust against changes in the mesh topology. For example, if the link between nodes 620 and 630 breaks while the ACK procedure is in progress, node 630 may be unable to send its ACK directly to node 620 and finding a new path from 630 to 620 may require extra hops and retransmissions. By contrast, if the ACK for node 620 is sent from node 640 when the packet is received by node 640, the ACK for node 620 may take another route through the mesh network from 640 to 620, based on the choice of routing algorithm.

In an embodiment, as a second alternative approach to the ACK procedure shown in FIG. 6, each node may retain the transmitted packet for an amount of time controlled by a respective timer. If a delivery failure indication for this packet arrives while the packet is still stored at the node, the node may determine a new next hop towards the packet's destination node and retransmit the packet to the new next hop. If a delivery failure indication for the packet arrives after the packet has been discarded (for instance, after the timer has expired), the packet may be considered undeliverable, which may, for example, result in propagating the delivery failure notification to the upstream node from which the packet was received. Eventually, these repeated delivery failure notifications can reach the source node of the packet, which can then indicate the delivery failure to upper layers. It can be seen that the second alternative approach is simpler but less robust than either the ACK procedure of FIG. 6 or the first alternative approach described above.

In an embodiment, in the face of a delivery failure, the node that experienced the failure can transmit the packet to the upstream node which can retransmit the packet. This procedure may be described as a back-propagation process. Using the simple network of FIG. 6 as an example, if node 630 is unable to transmit the packet to node 640 (step S663 of FIG. 6), node 630 may instead return the packet to node 620 with a delivery failure indication. Node 620 may then attempt to find a new route to node 640; if the attempt succeeds, node 620 may attempt to transmit the packet to node 640 through the new route, and if it is unable to find such a route, node 620 may back-propagate the packet to node 610 for potential retransmission. The back-propagation mechanism may have higher overhead than the previously described mechanisms in which intermediate nodes cache the packet for potential retransmission, but it may place a lower burden on the intermediate nodes in terms of storage requirements and implementation complexity.

In an embodiment, a further option for delivery failure handling includes blind forward transmission, in which the relay node selects a candidate next hop node in the hope that the candidate next hop is able to find a route to the destination. This approach may allow successful routing even for nodes that do not have completely updated routing tables. For example, if node 610 needs to transmit a packet to node 690 and node 610 does not have an entry for node 690 in its routing table, but node 610 has an expectation that a neighboring node 620 is well-connected to the mesh network, node 610 may transmit the packet to node 620 and rely on node 620 to find a route to node 690 (the dash line in FIG. 6). Certain topologies may benefit from such a behavior, and it may reduce the need to propagate detailed topological information to all nodes in the network. For example, in a "cluster-head" topology, where certain nodes are stably connected to the mesh network and act as gateways for changing clusters of nearby nodes, a cluster-head node may advertise itself as being well-connected, without distributing full details of its routes to individual nodes in the network.

In an embodiment, the SRAP ACKs mentioned in the above options may further include the source (610) and/or the destination (690) of the packet to be acknowledged, together with its sequence number (651), for identifying the packet-to-be-acknowledged.

Figure 7:
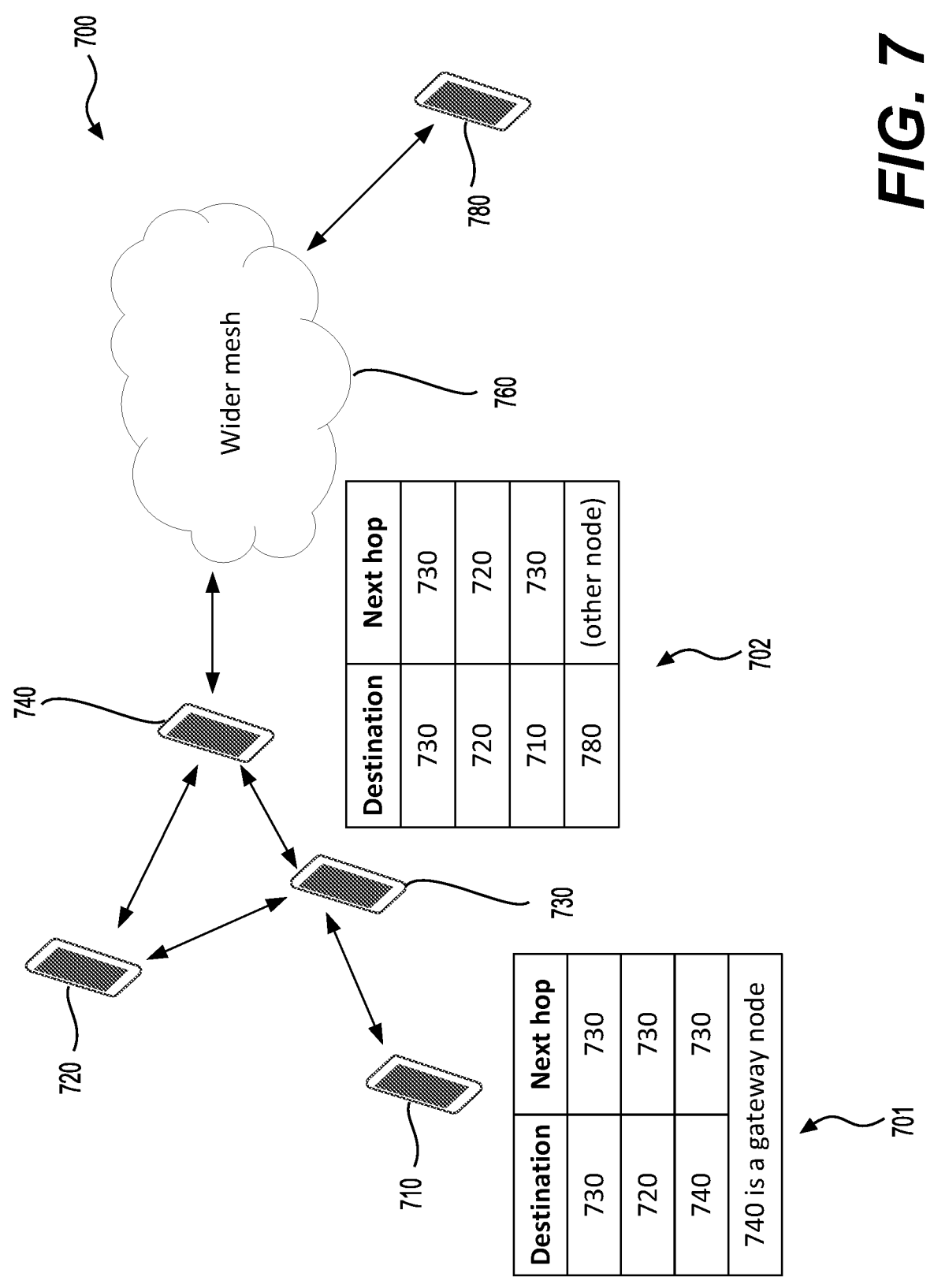
FIG. 7 shows an example of a cluster-head topology with a well-connected gateway node according to embodiments of the disclosure.

FIG. 7 shows an exemplary cluster-head topology with a well-connected gateway node according to embodiments of the disclosure. Nodes 710, 720, 730, and 740 form a cluster with node 740 as the head of the cluster, functioning as a gateway node to a larger mesh network (shown as a cloud 760 in FIG. 7). Node 740 is considered to be stably connected to the wider mesh 760, and advertises itself to its cluster members (710, 720, and 730) as the gateway node. The figure shows routing tables 701 and 702 stored by nodes 710 and 740, respectively. Nodes 710, 720, and 730 have routing information only for nodes within the cluster, which can be updated dynamically with relatively low latency, allowing these local routing tables to be maintained accurately. They also store the information that node 740 is the gateway node, meaning that node 740 can be used as a transfer point for routing to nodes that do not appear in the local routing tables, such as node 780 in the figure.

In an embodiment, if node 710 has a packet that needs to be delivered to node 780, node 710 first consults its routing table 701 to find an entry for node 780. Since node 780 is not a member of the local cluster, node 710 does not find such an entry. However, node 710 finds the information that node 740 is a gateway node of the local cluster. Accordingly, node 710 may deliver the packet to a next hop towards node 740, with node 780 as the ultimate destination of the packet. Based on the routing table 701 shown in the figure, node 710 delivers the packet to node 730 (since node 730 is shown as the next hop for reaching node 740). The packet may include information indicating node 740 as an intermediate destination. Alternatively, the packet may only indicate that node 780 is its ultimate destination and rely on the routing table at node 730 to determine an appropriate route for reaching 780. In either case, node 730 can deliver the packet to node 740, whose role as the gateway node may be known to node 730. Node 740 receives the packet and performs its routing procedure, but because of its gateway function, node 740 has an entry in its routing table 702 for node 780, which indicates that the next hop is a node outside the local cluster (indicated as "other node" in FIG. 7) and located inside the wider mesh cloud 760 in FIG. 7. Accordingly, node 740 delivers the packet to the next hop in the wider mesh cloud 760, which places the packet on a route through the cloud 760 to node 780. Note that this procedure depends on node 740 having stable connectivity to the wider-area mesh network 760, so that node 740 can accurately advertise itself as a well-connected node with the ability to reach nodes outside the local cluster.

In an embodiment, routes to gateways may be planned so that a reliable route to gateway(s) for a node is semi-static and can be identified by a path ID. When a packet is generated from a source node, if a destination node cannot be found on the routing table of the source node, the route to one gateway (intermediate node) may be identified by a path ID, in addition to the destination node ID. The hop(s) after the gateway (intermediate node) may be determined by consulting the routing table of the gateway and may be in a hop-by-hop routing or a path-based routing, while the route to the gateway from the source node is based on the path ID. In an example, the route to the gateway may be determined dynamically based on a hop-by-hop routing approach, while the route from the gateway to the destination node (or to a further intermediate destination, such as another gateway) may be semi-static and identified by a path ID.

In an embodiment, a well-connected node can offer gateway functionality to a cellular network. For services offered by a cellular operator's core network, or that need to be routed through the core network, a node originating traffic may need to deliver its packets to a node in the mesh network that has access to the core network (for instance, a base station that functions as a mesh node). It may be impractical for every base station of the operator's network to advertise itself as a separate mesh destination, especially since the service typically has no dependency on which base station routes traffic to the core network. The originating node may simply look for routing to a node that reports it has a network connection. Thus, a node with a connection to the operator's core network (for example, a relay UE in cellular coverage with a connection over a Uu interface to one or more base stations) may advertise itself as a gateway for network connectivity. This advertisement may take the form of a control PDU of the SRAP layer, for instance.

Figure 8:
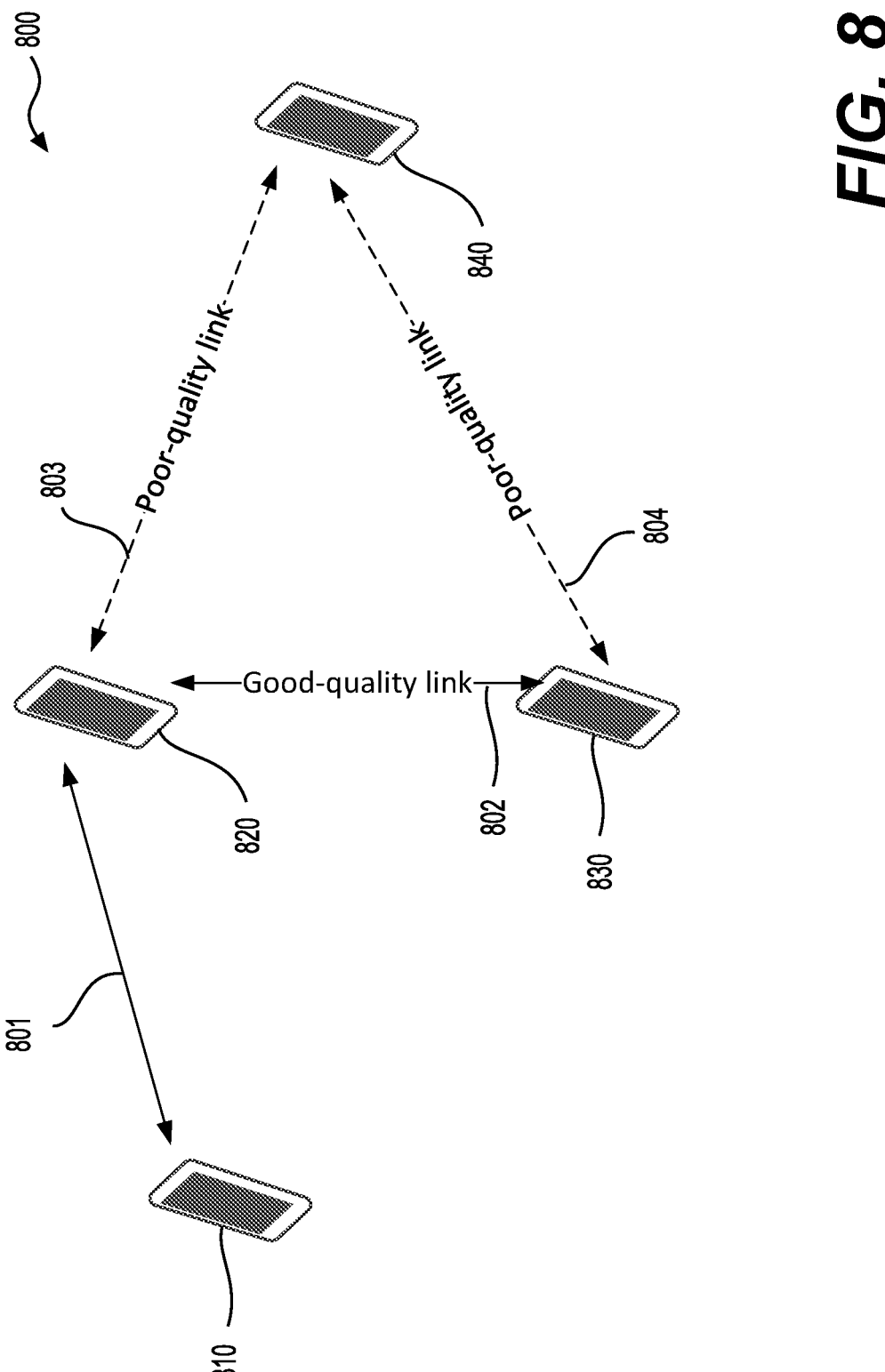
FIG. 8 shows an example of a mesh network that may induce a routing loop according to embodiments of the disclosure.

As mentioned above in the discussion of termination criteria, packets in a mesh network may under certain circumstances experience routing loops. FIG. 8 shows an exemplary mesh network that may induce a routing loop according to embodiments of the disclosure. In FIG. 8, node 810 has a link 801 only to node 820, nodes 820 and 830 have a good-quality link 802 to each other, and nodes 820 and 830 have poor-quality links 803 and 804 to node 840, respectively.

In an embodiment, node 810 generates a packet for delivery to node 840. Since node 810 has a link only to node 820, node 810 needs to transmit the packet first to node 820. Node 820 can have two routes to node 840: a direct route 820→840 through a poor-quality link 803, or an indirect route 820→830→840, which includes a good-quality link 802 from node 820 to node 830. Accordingly, node 820 may prefer to transmit the packet through the good-quality 802 to the next hop, i.e., node 820 may transmit the packet to node 830 for delivery to node 840. Node 830 can have two routes to node 840: a direct route 830→840 through a poor-quality link 804, or an indirect route 830→820→840, which includes the good-quality link 802 from node 830 to node 820. Accordingly, node 830 may prefer to transmit the packet through the good-quality link 802 to the next hop, i.e., node 830 may transmit the packet to node 820 for delivery to node 840. Thus, a loop may be induced between nodes 820 and 830. In this example, the loop behavior is due to an excessively greedy routing behavior that favors the good-quality link to the next hop and fails to give a weight to the poor-quality link to the next hop.

In an embodiment, the loop behavior can be detected. For example, node 820 may store the information that node 820 has previously forwarded a particular packet (which may be identified, for instance, by an SN), and if node 820 sees the same packet again, node 820 may discard the packet as undeliverable. Alternatively, node 820 may store not only the information that node 820 previously handled the packet, but also knowledge of which links node 820 forwarded the packet through, and if node 820 detects a return of a previously handled packet, node 820 may select a different link to forward the packet on. For example, if node 820 implements such an algorithm, the packet described above might travel on the route 810→820→830→820→840, instead of looping perpetually between nodes 820 and 830. When node 820 receives the packet from node 830, node 820 can recognize that the packet is in a loop, and then chooses an alternative egress route, which is the direct path to 840 in this example, for the next transmission of the packet. In addition, loops may be terminated by mechanisms such as a TTL or hop count limit, a delivery deadline for the packet, and so on. When a packet fails to be delivered because of a loop, the delivery failure handling mechanisms described above may apply.

The foregoing description applies to the handling of packets by relay nodes (which may also function as traffic destinations themselves). Certain nodes in the network may not operate as relay nodes, for example, because of restricted functionality of such nodes. A node may be only capable of operating as a remote node, where traffic can terminate but not be forwarded. The remote node may host an entity of the routing protocol layer (e.g., an SRAP entity), but the functionality of this entity may be limited to processing packets for the remote node itself. The remote node may have no routing table or have a limited routing table and may handle only incoming packets that are addressed to the remote node itself. The arrival of a packet addressed to another node may be treated as an error condition by the remote node. For example, if a remote node receives a packet from a relay node whose destination is different from the remote node, the remote node may send an error indication to the relay node. The error indication may, for example, be carried by a control PDU of the SRAP layer. Alternatively or in addition, the remote node may indicate the error to upper layers for handling according to a higher-layer protocol.

In an embodiment, a remote node may also originate traffic to be transmitted to other nodes in the network. Accordingly, even a remote-only node may require some routing functionality, to deliver traffic originated by the remote node itself towards destination nodes in the mesh network.

In an embodiment, a remote node may be singly connected to the mesh network, i.e., the remote node may be connected to only one relay node of the mesh network. In such a case, the remote node may not need a routing table, because all outbound packets can be delivered to the relay node.

In an embodiment, a remote node may be multiply connected to the mesh network, i.e., the remote node may be connected to a plurality of relay nodes of the mesh network. Such a remote node may maintain a routing table that allows the remote node to determine which relay node(s) represent (s) the best first hop(s) to the destination of a packet. Alternatively, a multiply connected remote node may send an outgoing packet to all the relay nodes with which the remote node has connections, allowing multiple attempts for the packet to reach the destination of the packet. This approach may, for instance, allow transmission of a packet with higher reliability than the use of a single link.

Figure 9:
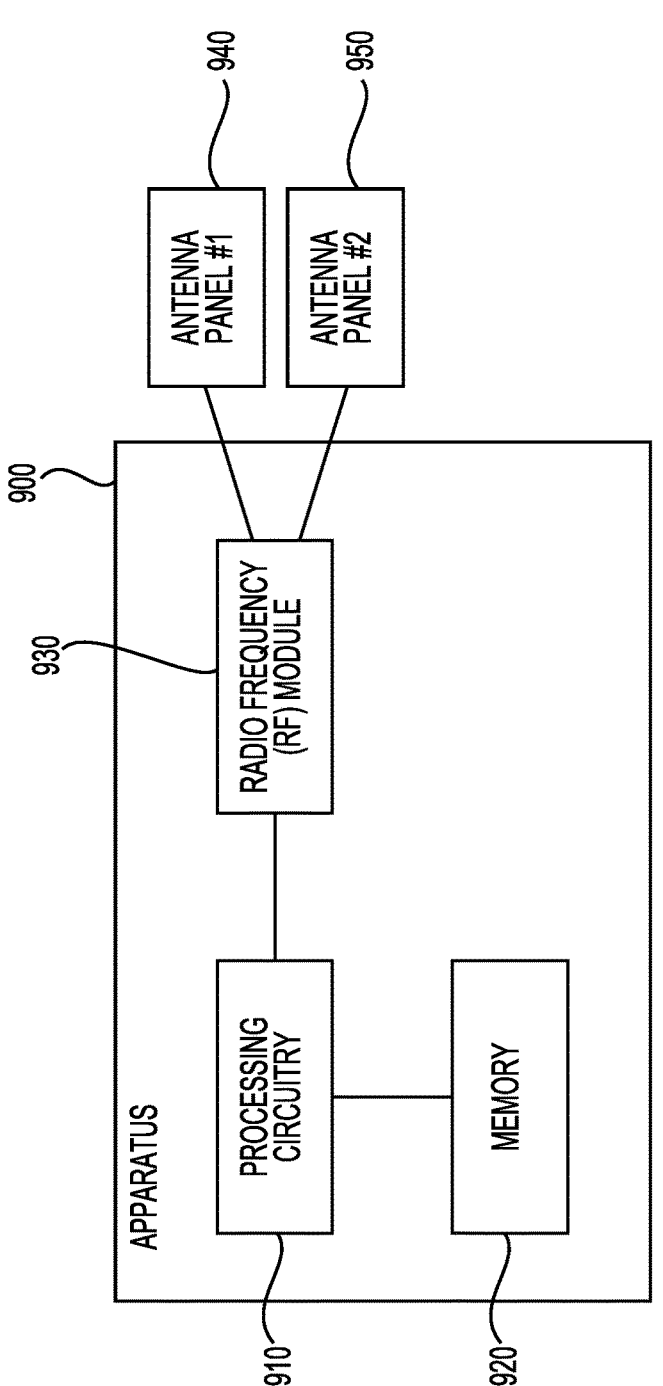
FIG. 9 shows an exemplary apparatus according to embodiments of the disclosure.

FIG. 9 shows an exemplary apparatus 900 according to embodiments of the disclosure. The apparatus 900 can be configured to perform various functions in accordance with one or more embodiments or examples described herein. Thus, the apparatus 900 can provide means for implementation of techniques, processes, functions, components, systems described herein. For example, the apparatus 900 can be used to implement functions of a UE or a BS (e.g., gNb) in various embodiments and examples described herein. The apparatus 900 can include a general purpose processor or specially designed circuits to implement various functions, components, or processes described herein in various embodiments. The apparatus 900 can include processing circuitry 910, a memory 920, and a radio frequency (RF) module 930.

In various examples, the processing circuitry 910 can include circuitry configured to perform the functions and processes described herein in combination with software or without software. In various examples, the processing circuitry 910 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 910 can be a central processing unit (CPU) configured to execute program instructions to perform various functions and processes described herein. Accordingly, the memory 920 can be configured to store program instructions. The processing circuitry 910, when executing the program instructions, can perform the functions and processes. The memory 920 can further store other programs or data, such as operating systems, application programs, and the like. The memory 920 can include a read only memory (ROM), a random access memory (RAM), a flash memory, a solid state memory, a hard disk drive, an optical disk drive, and the like.

The RF module 930 receives a processed data signal from the processing circuitry 910 and converts the data signal to beamforming wireless signals that are then transmitted via antenna panels 940 and/or 950, or vice versa. The RF module 930 can include a digital to analog convertor (DAC), an analog to digital converter (ADC), a frequency up convertor, a frequency down converter, filters and amplifiers for reception and transmission operations. The RF module 930 can include multi-antenna circuitry for beamforming operations. For example, the multi-antenna circuitry can include an uplink spatial filter circuit, and a downlink spatial filter circuit for shifting analog signal phases or scaling analog signal amplitudes. Each of the antenna panels 40 and 10 can include one or more antenna arrays.

In an embodiment, part of all the antenna panels 940/950 and part or all functions of the RF module 930 are implemented as one or more TRPs (transmission and reception points), and the remaining functions of the apparatus 900 are implemented as a BS. Accordingly, the TRPs can be co-located with such a BS, or can be deployed away from the BS.

The apparatus 900 can optionally include other components, such as input and output devices, additional or signal processing circuitry, and the like. Accordingly, the apparatus 900 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Aspects of the disclosure provide a method of packet routing operable in a relay node of a wireless mesh network. Under the method, a packet is received at a first protocol layer of the relay node from a previous-hop node. The packet includes indications of a source node and a destination node of the packet. When the relay node is not the destination node, it is determined whether the packet includes a path ID identifying a delivery route for the packet. When the packet includes the path ID and a routing table of the relay node includes a first next-hop node associated with the path ID, the packet is transmitted from the relay node to the first next-hop node. When the packet does not include the path ID or the routing table of the relay node does not include the first next-hop node associated with the path ID, the packet is transmitted from the relay node to one of a second next-hop node associated with the destination node and a third next-hop node associated with an intermediate destination node in the routing table of the relay node.

In an embodiment, the packet includes a packet body of the packet.

In an embodiment, it is determined whether the packet includes an indication of the intermediate destination node. When the packet includes the indication of the intermediate destination node and the routing table of the relay node includes the third next-hop node associated with the intermediate destination node, the packet is transmitted from the relay node to the third next-hop node associated with the intermediate destination node in the routing table of the relay node. When the packet does not include the indication of the intermediate destination node and the routing table of the relay node does not include the third next-hop node associated with the intermediate destination node, it is determined whether the routing table of the relay node includes the second next-hop node associated with the destination node. When the routing table of the relay node includes the second next-hop node associated with the destination node, the packet is transmitted from the relay node to the second next-hop node associated with the destination node in the routing table of the relay node.

In an embodiment, when the relay node is the destination node, the packet is processed at a second layer of the relay node, and an acknowledgement indication is sent to the source node of the packet.

In an embodiment, the acknowledgement indication is carried by a control protocol data unit (PDU) of a sidelink relay adaptation protocol routing (SRAP) protocol layer of the relay node.

In an embodiment, it is determined whether a termination condition for delivery of the packet is met.

In an embodiment, the termination condition includes a failure to determine a next-hop node from the routing table.

In an embodiment, the termination condition includes determining that a hop count for delivery of the packet has exceeded a maximum hop count.

In an embodiment, the termination condition includes determining that a time-to-live (TTL) associated with the packet has exceeded a maximum TTL.

In an embodiment, the termination condition includes determining that the packet has been previously handled at the relay node.

In an embodiment, when the termination condition is met, at least one of the following steps is performed: (i) the packet is discarded; (ii) a failure indication is sent from the relay node to at least one of the source node or the previous-hop node; (iii) the packet is sent to the previous-hop node; (iv) a route to the destination is requested from another node of the mesh network; and (v) the packet is forwarded to a candidate next-hop node that determines a route to the destination.

In an embodiment, the failure indication is carried by a control PDU of a routing protocol.

In an embodiment, the failure indication includes a copy of the packet.

In an embodiment, the candidate—next-hop node is a gateway node having connectivity to a cellular network.

In an embodiment, the connectivity to the cellular network is provided by a radio interface between the gateway node and a base station of the cellular network.

In an embodiment, the second next-hop node associated with the destination node in the routing table has a minimum hop count to the destination node among a plurality of candidate next-hop nodes associated with the destination node in the routing table.

In an embodiment, the second next-hop node associated with the destination node in the routing table has a maximum anticipated link quality to the destination node among a plurality of candidate next-hop nodes associated with the destination node in the routing table.

In an embodiment, the anticipated link quality is a function of measured radio link qualities of a plurality of intermediate nodes, and each of the plurality of intermediate nodes corresponds a respective path to the destination node.

In an embodiment, the relay node is one of a user equipment and a base station of a cellular network.

Aspects of the disclosure provide an apparatus operated as a relay node in a wireless mesh network for packet routing. The apparatus includes processing circuitry that receives a packet from a previous-hop node. The packet includes at least an indication of a source node of the packet, an indication of a destination node of the packet, and a packet body of the packet. When the relay node is not the destination node, the processing circuitry determines whether the packet includes a path ID identifying a delivery route for the packet. When the packet includes the path ID and a routing table of the relay node includes a first next-hop node associated with the path ID, the processing circuitry transmits the packet from the relay node to the first next-hop node. When the packet does not include the path ID or the routing table of the relay node does not include the first next-hop node associated with the path ID, the processing circuitry transmits the packet from the relay node to one of a second next-hop node associated with the destination node and a third next-hop node associated with an intermediate node in the routing table of the relay node.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of packet routing operable in a relay node of a wireless mesh network, the method comprising:
   receiving, at a first protocol layer of the relay node, a packet from a previous-hop node, the packet including indications of a source node and a destination node of the packet;
   when the relay node is not the destination node,
      determining whether the packet includes a path identifier (ID) identifying a delivery route for the packet;
      in response to the packet including the path ID and a routing table of the relay node including a first next-hop node associated with the path ID, transmitting the packet from the relay node to the first next-hop node; and
      in response to the packet not including the path ID or the routing table of the relay node not including the first next-hop node associated with the path ID, transmitting the packet from the relay node to one of a second next-hop node associated with the destination node and a third next-hop node associated with an intermediate destination node in the routing table of the relay node.

2. The method of claim 1, wherein the transmitting the packet from the relay node to the one of the second next-hop node associated with the destination node and the third next-hop associated with the intermediate destination node in the routing table of the relay node further comprises:
   determining whether the packet includes an indication of the intermediate destination node,
   in response to the packet including the indication of the intermediate destination node and the routing table of the relay node including the third next-hop node associated with the intermediate destination node, transmitting the packet from the relay node to the third next-hop node associated with the intermediate destination node in the routing table of the relay node;
   in response to the packet not including the indication of the intermediate destination node or the routing table of the relay node not including the third next-hop node associated with the intermediate destination node, determining whether the routing table of the relay node includes the second next-hop node associated with the destination node; and
   in response to the routing table of the relay node including the second next-hop node associated with the destination node, transmitting the packet from the relay node to the second next-hop node associated with the destination node in the routing table of the relay node.

3. The method of claim 1, further comprising:
   when the relay node is the destination node,
   processing the packet at a second layer of the relay node; and
   sending an acknowledgement indication to the source node of the packet.

4. The method of claim 3, wherein the acknowledgement indication is carried by a control protocol data unit (PDU) of a sidelink relay adaptation protocol (SRAP) layer of the relay node.

5. The method of claim 1, further comprising:
   determining whether a termination condition for delivery of the packet is met.

6. The method of claim 5, wherein the termination condition includes a failure to determine a next-hop node from the routing table.

7. The method of claim 5, wherein the termination condition includes determining that a hop count for delivery of the packet has exceeded a maximum hop count.

8. The method of claim 5, wherein the termination condition includes determining that a time-to-live (TTL) associated with the packet has exceeded a maximum TTL.

9. The method of claim 5, wherein the termination condition includes determining that the packet has been previously handled at the relay node.

10. The method of claim 5, wherein when the termination condition is met, the method further comprises at least one of:

discarding the packet;

sending a failure indication from the relay node to at least one of the source node or the previous-hop node;

sending the packet to the previous-hop node;

requesting a route to the destination from another node of the mesh network; and forwarding the packet to a candidate next-hop node that determines a route to the destination.

11. The method of claim 10, wherein the failure indication is carried by a control PDU of a routing protocol.

12. The method of claim 10, wherein the failure indication includes a copy of the packet.

13. The method of claim 10, wherein the candidate next-hop node is a gateway node having connectivity to a cellular network.

14. The method of claim 13, wherein the connectivity to the cellular network is provided by a radio interface between the gateway node and a base station of the cellular network.

15. The method of claim 1, wherein the second next-hop node associated with the destination node in the routing table has a minimum hop count to the destination node among a plurality of candidate next-hop nodes associated with the destination node in the routing table.

16. The method of claim 1, wherein the second next-hop node associated with the destination node in the routing table has a maximum anticipated link quality to the destination node among a plurality of candidate next-hop nodes associated with the destination node in the routing table.

17. The method of claim 16, wherein the anticipated link quality is a function of measured radio link qualities of a plurality of intermediate nodes, each of the plurality of intermediate nodes corresponding a respective path to the destination node.

18. The method of claim 1, wherein the relay node is one of a user equipment and a base station of a cellular network.

19. An apparatus operated as a relay node in a wireless mesh network for packet routing, the apparatus comprising:

processing circuitry configured to receive a packet from a previous-hop node, the packet including indications of a source node and a destination node of the packet;

when the relay node is not the destination node, determine whether the packet includes a path identifier (ID) identifying a delivery route for the packet;

in response to the packet including the path ID and a routing table of the relay node including a first next-hop node associated with the path ID, transmit the packet from the relay node to the first next-hop node; and in response to the packet not including the path ID or the routing table of the relay node not including the first next-hop node associated with the path ID, transmit the packet from the relay node to one of a second next-hop node associated with the destination node and a third next-hop node associated with an intermediate destination node in the routing table of the relay node.

20. A non-transitory computer-readable storage medium storing a program executable by at least one processor of a relay node in a wireless mesh network to perform:

receiving a packet from a previous-hop node, the packet including indications of a source node and a destination node of the packet;

when the relay node is not the destination node, determining whether the packet includes a path identifier (ID) identifying a delivery route for the packet;

in response to the packet including the path ID and a routing table of the relay node including a first next-hop node associated with the path ID, transmitting the packet from the relay node to the first next-hop node; and in response to the packet not including the path ID or the routing table of the relay node not including the first next-hop node associated with the path ID, transmitting the packet from the relay node to one of a second next-hop node associated with the destination node and a third next-hop node associated with an intermediate destination node in the routing table of the relay node.

* * * * *